G. R. WYMAN.
WATERPROOF BOOT.
APPLICATION FILED AUG. 3, 1911.

1,022,994.

Patented Apr. 9, 1912.

4 SHEETS—SHEET 1.

G. R. WYMAN.
WATERPROOF BOOT.
APPLICATION FILED AUG. 3, 1911.

1,022,994.

Patented Apr. 9, 1912.

4 SHEETS—SHEET 2.

WITNESSES

INVENTOR:
George R. Wyman,
by Dodge & Sons Attorneys.

COLUMBIA PLANOGRAPH CO., WASHINGTON, D. C.

G. R. WYMAN.
WATERPROOF BOOT.
APPLICATION FILED AUG. 3, 1911.
1,022,994.
Patented Apr. 9, 1912.
4 SHEETS—SHEET 3.
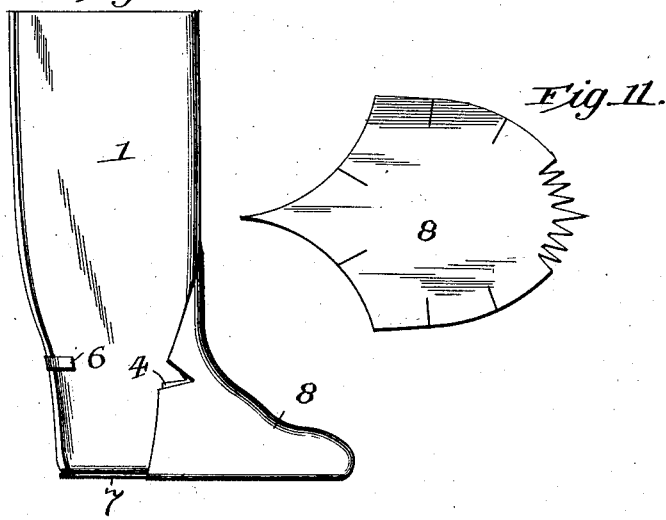
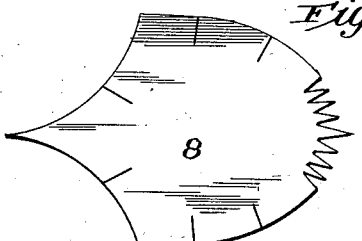
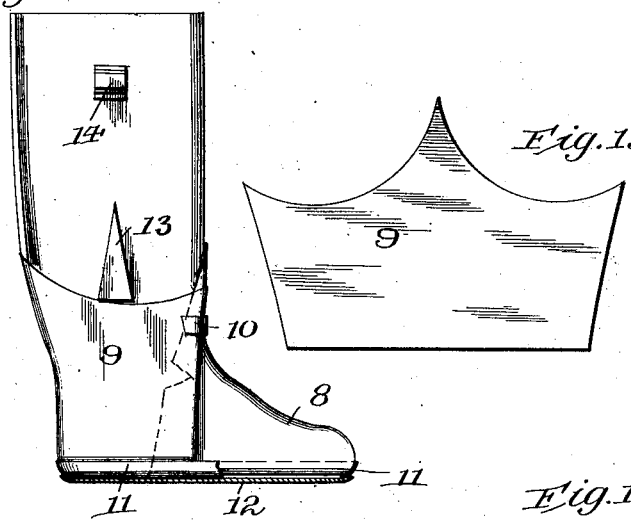
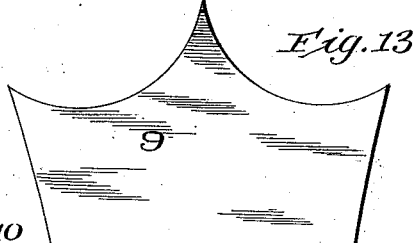
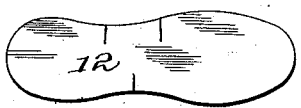
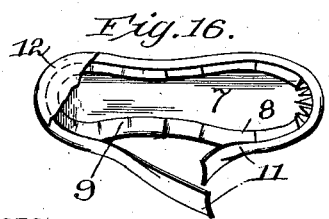
WITNESSES
INVENTOR:
George R. Wyman,
by Dodge & Sons
Attorneys.

G. R. WYMAN.
WATERPROOF BOOT.
APPLICATION FILED AUG. 3, 1911.
1,022,994.
Patented Apr. 9, 1912.
4 SHEETS—SHEET 4.
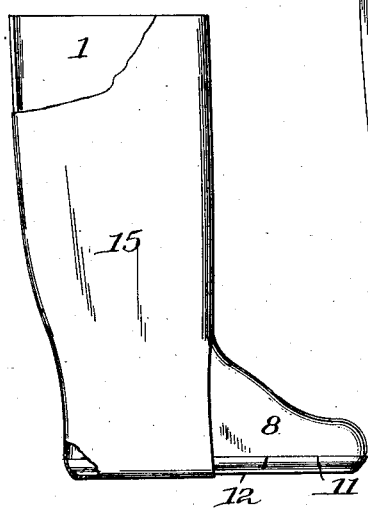
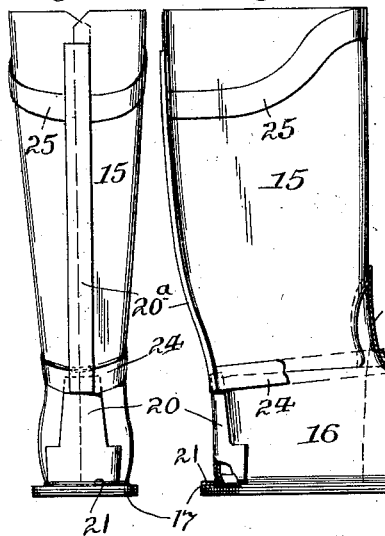
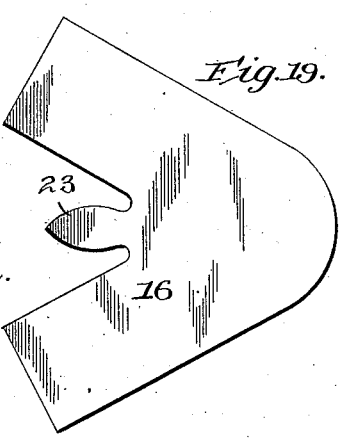
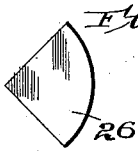
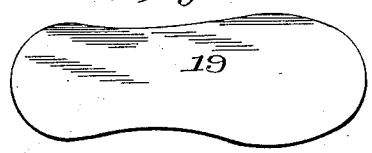
WITNESSES
INVENTOR:
George R. Wyman,
by Dodge & Sons
Attorneys.

UNITED STATES PATENT OFFICE.

GEORGE R. WYMAN, OF EAST WALPOLE, MASSACHUSETTS, ASSIGNOR TO CHARLES S. BIRD, OF EAST WALPOLE, MASSACHUSETTS.

WATERPROOF BOOT.

1,022,994. Specification of Letters Patent. Patented Apr. 9, 1912.

Application filed August 3, 1911. Serial No. 642,153.

*To all whom it may concern:*

Be it known that I, GEORGE R. WYMAN, a citizen of the United States, residing at East Walpole, in the county of Norfolk and State of Massachusetts, have invented certain new and useful Improvements in Waterproof Boots, of which the following is a specification.

My present invention pertains to an improved waterproof boot, and has for its primary object the production of a boot which, compared to rubber boots of today, is far more durable and yet withal cheaper to manufacture.

In a broad or generic sense, the boot may be said to comprise three sections or layers, namely, an inner lining, an outer, wear-resisting surface, and an intermediate waterproof section, the inner and outer sections being likewise waterproof to a greater or less degree.

With a boot constructed in accordance with my invention I am enabled to use material which otherwise could not be employed, for by fully protecting and inclosing the waterproof layer a relatively cheap and yet highly water-repellant material may be employed, said layer being hermetically sealed or inclosed within or between the inner and outer layers. The inner layer or lining will have a fabric foundation, which is light as compared to the outer, essentially wear-resisting surface, but it is to be understood that both said inner and outer layers are also, to a greater or less extent, of a water-repellant nature.

Figure 1:
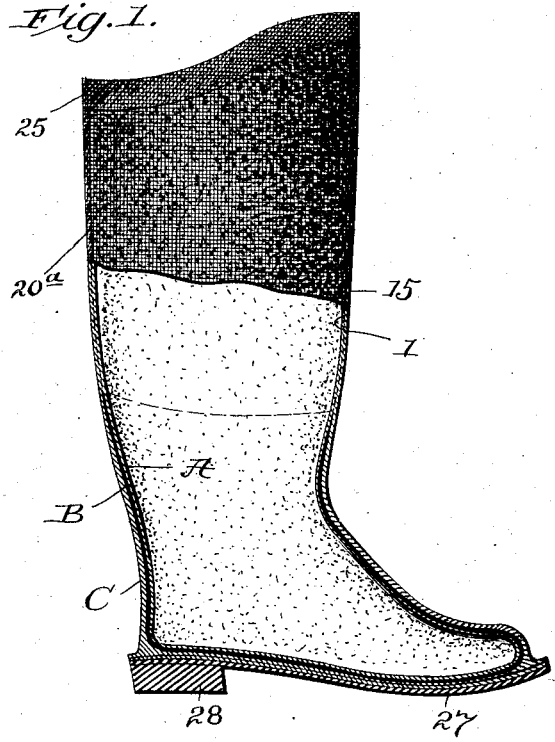
Figure 2:
Figure 4:
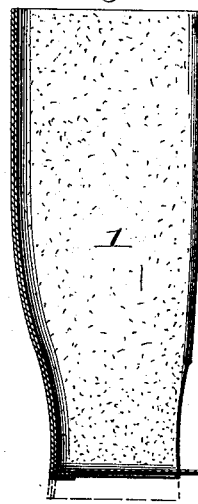
Figure 3:
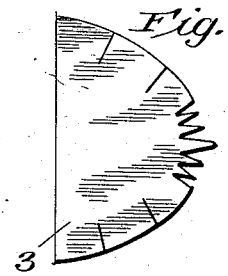
Figure 5:
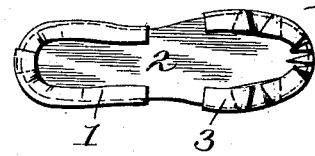
Figure 9:
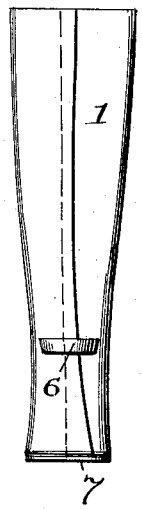
Figure 8:
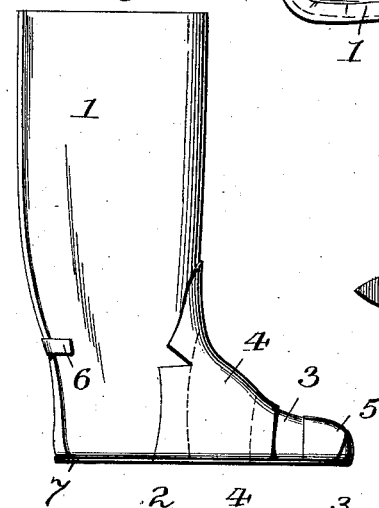
Figure 6:
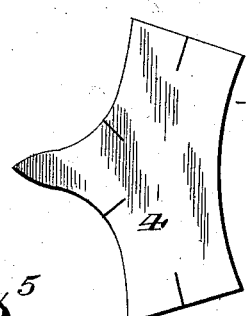
Figure 7:
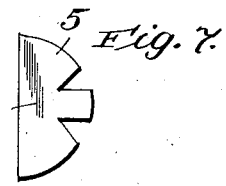
Figure 10:
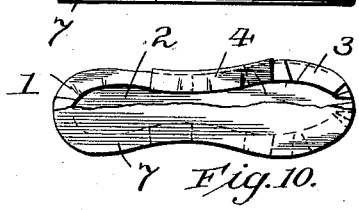

The complete boot is shown, in so far as it is possible of illustration, in Figure 1, wherein the boot, with the leather sole and heel, appears in sectional elevation, and in order to fully illustrate the manner in which the boot is constructed or made up to obtain the object above specified I have deemed it essential to illustrate and describe the various portions of the boot and substantially the order or manner in which they are assembled. Fig. 2 is a plan of the blank forming the leg and quarter of the lining; Fig. 3 a like view of the lining toe-piece, the same being notched to permit its ready conformation; Fig. 4 a sectional view illustrating the blanks of Figs. 2 and 3, positioned with reference to the inner sole; Fig. 5 a bottom plan view thereof; Fig. 6 a plan of the lining vamp; Fig. 7 a similar view of an additional top cap or piece; Fig. 8 a side elevation of the lining structure, showing the vamp in position and a stay or securing strip in place over the rear lap of the leg and counter member; Fig. 9 a rear elevation of the same; Fig. 10, a bottom plan view of the parts as they are thus far assembled, the sole being broken away longitudinally of the structure; Fig. 11 a plan view of the vamp or combined vamp and toe-piece formed of waterproof material and which goes to make up a portion of the intermediate waterproof layer or member; Fig. 12 a side elevation of the structure thus far produced with said vamp positioned; Fig. 13 a plan view of the counter; Fig. 14 a plan of the sole forming part of the waterproof layer; Fig. 15 a side elevation, partly in section, of the boot structure, showing the counter and sole as applied, and also certain other finishing elements hereinafter specifically referred to; Fig. 16 a bottom plan view of the boot, the sole being broken away, and the binding strip for the lower marginal portions of the vamp and counter being partly loosened; Fig. 17 a plan view of the combined leg and quarter of the outer or wear-resisting layer; Fig. 18 a side elevation of the boot with the same positioned; Fig. 19 a plan of the combined toe and vamp, made of the outer, wear-resisting material; Fig. 20 a similar view of the additional toe-piece or toe-cap; Fig. 21 a plan of one of the soles; Fig. 22 a like view of a finishing piece which is applied to the front of the boot; Fig. 23 a sectional elevation of the boot structure showing the various outer parts positioned upon the other parts and certain seam-covering and finishing strips in position, the structure being ready for vulcanization; and Fig. 24 a rear elevation of such structure.

In the manufacture of the boot it will be understood that the structure is built up over a boot-tree or form, the combined leg and quarter piece 1, Fig. 2, being first drawn around the tree, cement being applied to the overlapping rear seam and tacks driven in to temporarily hold the same in place. A sole piece 2 is then positioned, or it may be positioned before the blank; and the lower end of the counter section drawn in over the sole, cement being applied to the parts to make them adhere. A toe-piece 3, notched and slitted, is then positioned and the edge thereof carried in over the sole. The vamp 4, Fig. 6, is then applied and as will be noted upon reference to Figs. 8, 9 and 10, the parts overlap one another, forming what may be termed a continuous stocking or lining member. The parts so far referred to are of sheet material, having a relatively light fabric foundation, carrying a body of vulcanizable material which is waterproof to a greater or less extent. The outer face or that which comes next to the waterproof layer of the boot, may be frictioned or skimmed with rubber. A toe-cap or box-piece 5, Fig. 7, composed of vulcanizable and water-repellant material, will next be positioned, see Fig. 8, and a staystrip 6, formed of the same material will preferably be laid across the rear seam of the leg piece and quarters 1 to hold the same preparatory to placing the members which go to form the intermediate waterproof layer. The application or placement of the pieces which go to form said waterproof layer now takes place. The pieces are formed from sheet material, preferably without fiber, and composed of such material as will vulcanize under the action of heat and pressure, the composition containing a slight amount of rubber and capable of being molded or stretched to a greater or less extent, so that the parts will fully conform to the inner or lining member. A sole 7, frictioned with rubber on both sides, is first applied, see Figs. 8, 9, 10 and 12, said sole being of such dimensions as to extend to the outer margin of the bottom of the structure thus far formed. There is then applied a combined vamp and toe-piece 8, Fig. 11, the lower edge or margin of which will be carried in over the edge of the sole 7 and thereafter a counter 9 will be positioned, the forward edges of the counter being carried well over the vamp and temporarily held by a cross-strip 10. A binding strip 11 is then carried around the lower portions of the vamp and counter and a second waterproof sole 12 is applied. These parts, to wit: 7, 8, 9, 11 and 12, constitute the intermediate layer, or the main waterproof layer, and as with all the other parts, have cement applied thereto before they are placed. A triangular piece 13, Fig. 15, is applied to each side of the boot, above the ankle to stiffen and reinforce the sides of the boot, and laminated sections 14 are applied upon each side near the top of the leg to form anchoring members to which straps may be secured. The structure is now ready to receive the outer or wear-resisting layer, which is also waterproof or water-resisting to a greater or less extent. The material thus far used and which has been found highly efficient, is formed from 12 oz. duck skimmed with rubber upon the inner face and then frictioned upon both sides. A combined leg and quarter section 15, Figs. 17 and 18, is first positioned, the lower edges thereof being carried in over the sole. An upper 16, Fig. 19, is then positioned, the upper being of such dimensions that it will extend entirely around the heel of the boot and overlap at the rear, the lower margin of said upper being turned out forming a flange 17. Two soles 18 and 19, the plan of which is shown in Fig. 21, are then applied, said soles being of such dimensions as to be coextensive of the out-turned flange 17. As before stated, the parts will be treated with a vulcanizable cement as they are positioned. To cover the rear seam at the heel a piece 20 of vulcanizable material, free from fabric, will be cemented over the seam, and carried out, as at 21, over the flanged edge 17. A picket-shaped throat-piece 22, Fig. 22, is also placed over the similar throat-piece 23, formed on the upper, being somewhat larger, so as to extend beyond the edges of the latter. A strip 24 passes around the ankle of the boot, covering the upper edge of the upper. A third strip 25 will preferably be secured around the boot adjacent to the upper end thereof, the part being inclined downwardly to the rear of the boot. A strip 20[a] will then be placed over the rear seam or joint of the boot-leg. A toe-piece 26, Fig. 20, will preferably be cemented in place, as shown in Fig. 23. After the parts are thus assembled, the tree is withdrawn, and an expansible bag, having the general shape of the boot, is inserted in its stead. The boot is then inclosed in a mold or die, and the same is subjected to a temperature sufficiently high to vulcanize the parts of the boot throughout, pressure, of course, being maintained within the bag so as to force the various layers and parts together and also to produce a smooth and even finish on the inner face of the lining layer. After the parts have been sufficiently vulcanized and withdrawn from the mold, a leather sole 27 and a suitable heel 28 will be secured in place; said sole being stitched to the flanged portion 17 of the upper and the sole pieces 18 and 19, after which the heel will be nailed to the leather sole 27.

During the process of vulcanization the strips 20, 24 and 25, and the throat-piece 22, become substantially an integral portion of the outer wear-resisting layer, being distinguishable therefrom by taking a high finish and appearing somewhat blacker. These parts, excepting strip 25, form covers for the joints which they overlie, preventing water from getting to the fibers of the canvas and thereby being carried to the interior of the boot by capillary action. Such strips and cap or toe-piece 26 and cover 22 also lend a finish to the boot, the upper end of which is cut off to conform to the curvature of the upper edge of strip 25, as shown in Fig. 1.

The boot may, if desired, be provided with a leather insole.

When finished the boot has the appearance as shown in Fig. 1, the various layers being homogeneously combined and the various joints in the parts being almost, if not entirely imperceptible. In order, however, that the invention may be clearly understood I have endeavored in Fig. 1 to clearly show the three layers, the inner or lining layer indicated by A, the intermediate waterproof layer by B, and the outer somewhat heavier wear-resisting layer by C.

While I have above set forth the various steps and shown the details of the parts which enter into the boot, it is to be understood that all of said parts are not essential to the manufacture of a waterproof boot, yet to produce a lasting and highly commercial boot the above-outlined steps should be followed.

Having thus described my invention, what I claim is:

1. A boot composed essentially of three layers, namely, an inner lining, an outer wear-resisting surface, and an intermediate highly-waterproof layer covering the foot portion and underlying the inner sole of the boot, the same being hermetically sealed by vulcanization within and between the other layers, and stopping short of the exposed edges of the boot structure, whereby a relatively cheap material may be employed for such waterproof layer.

2. A boot composed essentially of three layers, namely, an inner relatively light lining comprising a fabric impregnated with a vulcanizable material; an outer wear-resisting surface comprising a strong fabric likewise impregnated with or carrying a vulcanizable material; and an intermediate waterproof layer formed from sheet waterproof material capable of being vulcanized, said intermediate layer stopping short of any exposed edge of the boot, the various layers being vulcanized to unite the parts and to hermetically seal the intermediate layer.

3. A boot composed essentially of three layers, namely, an inner lining composed of a series of sections having overlapping edges and formed from a relatively light fabric impregnated with a vulcanizable material and skimmed on that side adjacent to the next layer with rubber; an intermediate layer composed of a series of sections having overlapping edges and formed from a highly waterproof sheet material; and an outer wear-resisting surface or layer composed of a series of sections having overlapping edges, said sections being formed of duck treated with rubber, the various layers being vulcanized together whereby the interior waterproof layer will be hermetically sealed between the inner and outer layers and protected thereby.

4. A boot composed essentially of three layers, namely, an inner lining composed of a series of sections having overlapping edges and formed from a relatively light fabric impregnated with a vulcanizable material and skimmed on that side adjacent to the next layer with rubber; an intermediate layer composed of a series of sections having overlapping edges and formed from a highly waterproof sheet material; an outer wear-resisting surface or layer composed of a series of sections having overlapping edges, said sections being formed of duck treated with rubber; and a plurality of members formed from vulcanizable material overlying the joints of the outer sections, the various parts being vulcanized together, whereby the interior waterproof layer will be hermetically sealed between the inner and the outer layer and protected thereby, and the joints of the outer layer will be covered and protected.

5. A boot composed of the following members or parts vulcanized together under pressure, to wit: an inner lining composed of a series of sections of relatively light fabric treated with rubber on its outer face, an intermediate waterproof layer composed of a series of sections of a cheap waterproof material; an outer wear-resisting surface formed in section from duck treated with rubber, said outer surface having an inner and an outer sole of such material; an upper, the lower marginal portion of the upper being carried or flanged outwardly and overlying the outer sole; and strips overlying the joints of the outer surface.

6. A boot comprising a lining; a waterproof layer placed thereon; an outer wear-resisting surface formed from duck, said lining and outer surface being treated with rubber upon those surfaces which contact with the waterproof layer; and strips of waterproof and vulcanizable material overlying the joints in said outer wear-resisting surface, the parts being vulcanized under heat and pressure, whereby the waterproof layer will be hermetically sealed between the lining and outer surface, and the edges of the outer surface will be closed against the entrance of moisture.

7. A boot comprising the following members vulcanized together under heat and pressure, to wit: a lining formed of a combined leg piece and quarters, a toe-piece; a vamp and a sole, said members being formed from a fabric treated with rubber upon its outer face; a waterproof layer formed of a vamp and toe-piece, a counter, a sole, a strip passed around the lower edges of the vamp and counter and binding the same upon the sole, and a second sole applied to the strip; an outer wear-resisting surface formed of a combined leg and quarters, an upper, the lower edge of which is flanged outwardly, a sole secured to the under face of the flange, and a second sole imposed upon the sole just mentioned, said parts being produced from duck treated with rubber; and strips of vulcanizable material overlying the joints of the leg, the quarters and the upper.

8. A boot, comprising in combination an inner lining; a waterproof layer coextensive of the foot and the lower portion of the boot-leg; an outer wear-resisting surface overlying the waterproof layer throughout, the parts being vulcanized together and said outer wear-resisting surface having a flange extending outwardly therefrom around the bottom of the boot; and a sole connected to the flange.

9. A boot, comprising in combination an inner lining; an outer wear-resisting surface coextensive of the lining and formed of heavy duck, the lower portion of said outer wear-resisting surface projecting outwardly to form a flange around the sole portion of the boot; a waterproof layer located between the lining and the outer wear-resisting surface but not extending into the flange aforesaid; and a sole sewed to the flange.

In testimony whereof I have signed my name to this specification in the presence of two subscribing witnesses.

GEORGE R. WYMAN.

Witnesses:
H. H. MILLER,
M. M. RINES.

---

Copies of this patent may be obtained for five cents each, by addressing the "Commissioner of Patents, Washington, D. C."